(No Model.)

W. W. HURD.
CAN OPENER.

No. 583,999. Patented June 8, 1897.

WITNESSES:
C. Nordfors
C. Gerst

INVENTOR
William W. Hurd
BY
Edgar Tate & Co
ATTORNEYS.

UNITED STATES PATENT OFFICE.

WILLIAM W. HURD, OF RYE, NEW YORK.

CAN-OPENER.

SPECIFICATION forming part of Letters Patent No. 583,999, dated June 8, 1897.

Application filed February 26, 1896. Serial No. 580,878. (No model.)

*To all whom it may concern:*

Be it known that I, WILLIAM W. HURD, a citizen of the United States, and a resident of Rye, in the county of Westchester and State of New York, have invented certain new and useful Improvements in Can-Openers, of which the following is a specification, reference being had to the accompanying drawings, forming a part thereof, in which similar letters of reference indicate corresponding parts.

This invention relates to can-openers, and the object thereof is to provide an effective device of this class by which the head of a can may be quickly and easily cut out, a further object being to provide a can-opener which is simple in construction and operation and comparatively inexpensive.

The invention is fully disclosed in the following specification, of which the accompanying drawings form a part, in which—

Figure 1:
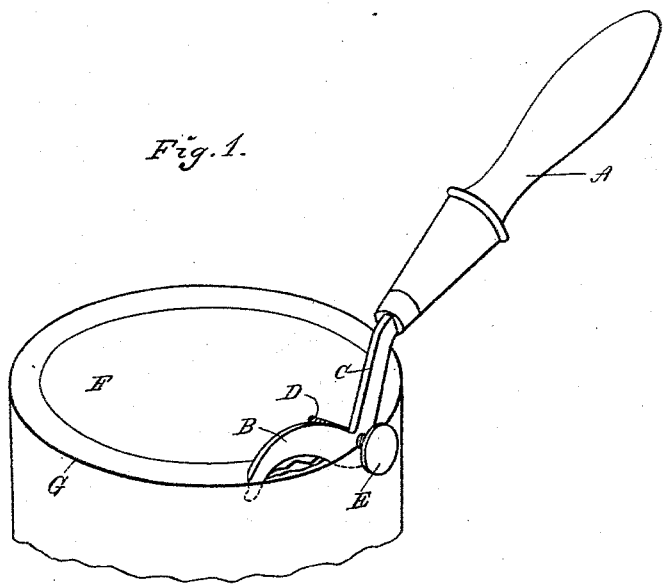
Figure 2:
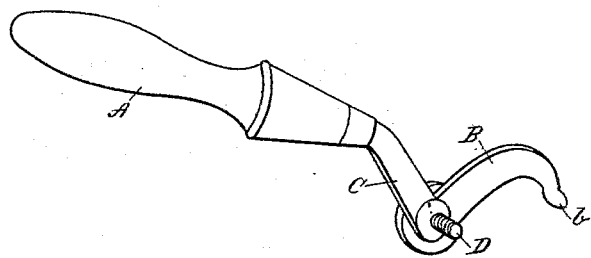

Figure 1 is a perspective view of a portion of a can and showing the method of operating my improved can-opener, and Fig. 2 a perspective view of the latter.

In the practice of my invention I provide a can-opener which comprises a handle A of any desired form and composed of any desired material, and secured in one end of the handle A is a segmental blade B, which is connected with said handle by a shank C, which is formed integrally therewith, and said shank is formed at an angle to the blade B, and these parts resemble to an extent the letter V, and the outer end of the blade B is provided with a short outwardly and upwardly directed hook or projection $b$, and the upper edge thereof from said hook or projection to the shank C being provided with a cutting edge.

Passing transversely through the elbow of the blade and the shank C, or that part thereof by which said blade and said shank are united, is a set-screw D, provided with a head E, and the operation of this device will be readily understood from the foregoing description when taken in connection with the accompanying drawings and the following statement thereof.

In Fig. 2 I have shown the position of my improved can-opener when applied to a can, and in operation the hook or projection $b$ is forced through the head F of the can adjacent to the side flange G thereof, and the set-screw D is then adjusted so that the flange or rim G fits between the head E of the set-screw and the elbow of the blade B, and this set-screw serves as a fulcrum on which the blade is operated as a lever, the end of the blade being depressed and raised by the handle and at the same time pressed forward and carried around the can until the entire head thereof is cut out.

In the depression of the handle the hook or projection $d$ prevents the blade from being entirely detached from the head of the can, and it will thus be seen that I accomplish the object of my invention by means of a device which is simple in construction and operation and comparatively inexpensive.

It is evident that changes in the form of my improved can-opener or the parts of which it is composed may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

A can-opener having a handle, a shank engaging said handle, a segmental blade in turn engaging said shank, said blade being formed at an angle to said shank, and resembling in form the letter V, an outwardly and upwardly directed hook secured to the outer end of said blade, said upper edge from the hook or projection to the said shank being provided with a cutting edge, a set-screw passing transversely through the elbow of said blade and shank, a head on said set-screw, all of the said parts being combined substantially as and for the purposes set forth and described.

In testimony that I claim the foregoing as my invention I have signed my name, in presence of the subscribing witnesses, this 20th day of February, 1896.

WILLIAM W. HURD.

Witnesses:
C. GERST,
N. J. SUNESON.